US012673890B2

(12) United States Patent
Zhang et al.

(10) Patent No.: US 12,673,890 B2
(45) Date of Patent: Jul. 7, 2026

(54) LOW-DENSITY HIGH-PERFORMANCE GLASS FIBER COMPOSITION, GLASS FIBER AND COMPOSITE MATERIAL THEREOF

(71) Applicant: JUSHI GROUP CO., LTD., Tongxiang City (CN)

(72) Inventors: Lin Zhang, Tongxiang City (CN);
Wenzhong Xing, Tongxiang City (CN);
Guorong Cao, Tongxiang City (CN);
Zhonghua Yao, Tongxiang City (CN);
Yunfeng Chai, Tongxiang City (CN);
Juan Liu, Tongxiang City (CN)

(73) Assignee: Jushi Group Co., Ltd., Tongxiang City (CN)

( * ) Notice: Subject to any disclaimer, the term of this patent is extended or adjusted under 35 U.S.C. 154(b) by 489 days.

(21) Appl. No.: 18/267,682

(22) PCT Filed: Apr. 10, 2023

(86) PCT No.: PCT/CN2023/087255
§ 371 (c)(1),
(2) Date: Jun. 15, 2023

(87) PCT Pub. No.: WO2024/197975
PCT Pub. Date: Oct. 3, 2024

(65) Prior Publication Data
US 2024/0391821 A1 Nov. 28, 2024

(30) Foreign Application Priority Data
Mar. 29, 2023 (CN) .......................... 202310319034.6

(51) Int. Cl.
*C03C 13/00* (2006.01)
*C03C 3/087* (2006.01)

(52) U.S. Cl.
CPC .............. *C03C 13/00* (2013.01); *C03C 3/087* (2013.01); *C03C 2213/00* (2013.01)

(58) Field of Classification Search
CPC ..... C03C 13/00; C03C 3/087; C03C 2213/00; C03C 3/091
See application file for complete search history.

(56) References Cited

U.S. PATENT DOCUMENTS

| | | | |
|---|---|---|---|
| 8,586,491 B2 | 11/2013 | Hofmann et al. | |
| 10,239,781 B2 | 3/2019 | Zhang et al. | |
| 10,329,189 B2 | 6/2019 | Zhang et al. | |
| 11,214,512 B2 | 1/2022 | McGinnis et al. | |
| 11,884,575 B2 | 1/2024 | Cao et al. | |
| 2015/0133284 A1 | 5/2015 | Yves et al. | |
| 2018/0179103 A1 | 6/2018 | Zhang et al. | |
| 2018/0186688 A1* | 7/2018 | Zhang | C03C 3/095 |
| 2018/0208497 A1 | 7/2018 | Zhang et al. | |
| 2019/0077699 A1 | 3/2019 | Zhang et al. | |

| | | | | |
|---|---|---|---|---|
| 2019/0169066 A1 | 6/2019 | Zhang et al. | | |
| 2021/0047230 A1 | 2/2021 | Zhang et al. | | |
| 2021/0206688 A1 | 7/2021 | Cao et al. | | |

FOREIGN PATENT DOCUMENTS

| | | | | |
|---|---|---|---|---|
| CN | 102849958 A | 1/2013 | | |
| CN | 106082639 A | 11/2016 | | |
| CN | 108395109 A | 8/2018 | | |
| CN | 109422464 A | 3/2019 | | |
| CN | 109928641 A | 6/2019 | | |
| CN | 113213756 A | 8/2021 | | |
| CN | 115432932 A | * 12/2022 | ............. | C03C 13/00 |
| KR | 20180112028 A | 10/2018 | | |
| KR | 20200123158 A | 10/2020 | | |

(Continued)

OTHER PUBLICATIONS

CN-115432932-A machine translation (Year: 2022).*
Egyptian 1st Office Action with English Translation, Patent Application No. 2023081225, Filing Date: Aug. 14, 2023, Dated: Feb. 3, 2025.
Korean 2nd Office Action with English Translation, Patent Application No. 10-2023-7024554, Filing Date: Jul. 18, 2023, Dated: Apr. 17, 2025.
Russian 2nd Office Action with English Translation, Patent Application No. 2024106589/03(014602), Filing Date: Apr. 4, 2023, Dated: Feb. 17, 2025.
PCT Search Report, Int. Serial No. PCT/CN2023/087255, Int. Filing Date: Apr. 10, 2023.
1st Chinese Office Action with English Translation, Application No. 202310319034.6, Examiner Name: Chen Siyan, Dated: Dec. 19, 2023.

(Continued)

*Primary Examiner* — Cameron K Miller

(74) *Attorney, Agent, or Firm* — Reising, Ethington, P.C.

(57) ABSTRACT

The present disclosure provides a low-density high-performance glass fiber composition, and a glass fiber and a composite. The glass fiber composition comprises the following components expressed as percentage by weight: $SiO_2$: 58.1%-61.9%, $Al_2O_3$: >19.8% and ≤23%, MgO: 9.6%-12.7%, CaO: 4.1%-7.9%, $SrO+Li_2O$: 0.05%-2.2%, SrO: 0%-2%, $Li_2O$: 0%-0.39%, $Na_2O$: 0.05%-1.0%, $R_2O=Na_2O+K_2O+Li_2O$: 0.2%-1.6%, $Fe_2O_3$: 0.05%-1%, $TiO_2$: 0.01%-2%, $B_2O_3$: 0%-2%, $ZrO_2$: 0%-2%, and $SiO_2+Al_2O_3$: 78%-84%. The components have a total content of greater than or equal to 98.5%; a weight percentage ratio $C1=SiO_2/(CaO+Li_2O)$ is greater than or equal to 7.05, a weight percentage ratio $C2=(R_2O+SrO)/Al_2O_3$ is greater than or equal to 0.012, and a weight percentage ratio $C3=(MgO+SrO)/CaO$ is greater than or equal to 1.22. The glass fiber composition has the characteristics of low density and high modulus, and has higher specific modulus and specific strength, better lightweight level, and cost advantages.

19 Claims, No Drawings

(56)                    References Cited

FOREIGN PATENT DOCUMENTS

| RU | 2641050  | C2 | 1/2018  |
|----|----------|----|---------|
| RU | 2728618  | C2 | 7/2020  |
| RU | 2747140  | C2 | 4/2021  |
| WO | 0073231  | A1 | 12/2000 |
| WO | 2017190405 | A1 | 11/2017 |
| WO | 2019041581 | A1 | 3/2019  |

OTHER PUBLICATIONS

Canadian Office Action, Application No. 3,204,353, Owner: Jushi Group Co., Ltd., Title: Low-Density High-Performance Glass Fiber Composition, Glass Fiber and Composite Material Thereof, Date: Jul. 26, 2024.
Korean Office Action, Application No. 10-2023-7024554, Application Date: Jul. 18, 2023, Date: Aug. 26, 2024.
Russian Office Action, Application No. 2024106589/03(014602), Application Filing Date: Apr. 10, 2023, Applicants: Jushi Group Co., Ltd., Date: Sep. 30, 2024.

* cited by examiner

LOW-DENSITY HIGH-PERFORMANCE GLASS FIBER COMPOSITION, GLASS FIBER AND COMPOSITE MATERIAL THEREOF

CROSS REFERENCE TO RELATED APPLICATION

The present application claims priority to Chinese Patent Application No. 202310319034.6 filed on Mar. 29, 2023 and entitled "LOW-DENSITY HIGH-PERFORMANCE GLASS FIBER COMPOSITION, GLASS FIBER AND COMPOSITE MATERIAL THEREOF", the disclosure of which is incorporated herein by reference in its entirety.

TECHNICAL FIELD

The present disclosure relates to a glass fiber composition, in particular, to a low-density high-performance glass fiber composition as a reinforcement base material for advanced composites, and to the glass fiber and composite material thereof.

BACKGROUND

Glass fiber belongs to inorganic fiber materials, and composite materials with excellent performances can be prepared by using a glass fiber-reinforced resin. As a reinforcement base material for advanced composites, high-performance glass fibers are originally mainly used in the fields of aviation, aerospace, national defense and military industry, and sports equipment. With the advancement of science and technology and economic development, the high-performance glass fibers have been widely used in civil industries such as wind blades, automobile manufacturing, high-pressure vessels, electronic communications, building materials, and pipelines. In order to actively promote global carbon peaking and carbon neutrality, the demand for large-scale and lightweight blades in the wind power industry continues to increase, and puts forward new requirements for the development of glass fiber. Pursuing high-performance glass fibers with higher modulus and strength, lower density, better specific modulus and specific strength, more excellent fiber forming performance, and significantly reduced cost and production risk, achieving large-scale tank furnace production, and effectively balancing and improving the performance, cost-effectiveness, and lightweight level of high-performance glass fibers have become an urgent task.

S-glass is one of the earliest high-performance glasses, and has a composition mainly based on $MgO$—$Al_2O_3$—$SiO_2$ system. The international organization American Society for Testing and Materials (ASTM) defines the S-glass as a family of glasses mainly composed of oxides of magnesium, aluminum, and silicon. For example, there is S-2 glass developed in the United States as a typical solution. In the S-2 glass, the total weight percentage of $SiO_2$ and $Al_2O_3$ reaches 90%. The contents of $SiO_2$ and $Al_2O_3$ are about 65% and 25% respectively, and the MgO content of about 10%. This type of glass has high temperature and great difficulty in melting, with a forming temperature as high as 1571° C., and a liquidus temperature as high as 1470° C. These factors make glass fiber forming difficult. Moreover, due to the lack of sufficient free oxygen, a large number of aluminum ions can only be filled in the network voids together with magnesium ions, thus greatly increasing the risk of glass devitrification. Furthermore, since there is a lack of effective competition during crystallization, the single crystal phase shows strong crystallization tendency and high crystallization temperature and rate. In view of this, the production of S-2 glass fiber is highly difficult. The existing technology is not only unable to realize the mass production in tank furnaces, but also even difficult to conduct one-step glass fiber production. As a result, S-2 glass fiber has small production scale, low efficiency, and high cost, which cannot meet the application requirements of large-scale industrialization.

A French company has developed an R-glass with $MgO$—$CaO$—$Al_2O_3$—$SiO_2$ system as a main body, involving patent FR1435073A. However, the traditional R-glass has excessively high alumina content, and the design of the total amount of silicon and aluminum, the total amount of alkaline earth metal oxides, and their proportions are unreasonable. These lead to difficulties in glass forming and high risk of crystallization, and make the glass show a forming temperature reaching 1410° C., a liquidus temperature reaching 1350° C., and a high glass crystallization rate. Accordingly, these factors make it difficult for traditional R-glass fiber to achieve large-scale tank furnace production. In addition, public information shows that the modulus of traditional R glass fiber is less than 90 GPa, resulting in low cost-effectiveness and competitiveness.

Japanese patent JP8231240 discloses a glass fiber composition. The composition comprises 62%-67% of $SiO_2$, 22%-27% of $Al_2O_3$, 7%-15% of MgO, 0.1%-1.1% of CaO, and 0.1%-1.1% of $B_2O_3$ in weight percentage. Compared with S-glass, the number of bubbles of the composition has improved. However, the forming of this composition is still extremely difficult, and the forming temperature exceeds 1460° C., such that it is not conducive to realizing large-scale tank furnace production.

Chinese patent CN108609859A discloses a high-modulus glass fiber composition. The composition comprises 53%-55.9% of $SiO_2$, 21.1%-23.9% of $Al_2O_3$, 9.9%-11.8% of MgO, 8.2%-9.9% of CaO, and 76.5%-79% of $SiO_2$+$Al_2O_3$ in weight percentage, and the weight percentage ratio of $Al_2O_3/SiO_2$ is 0.38-0.45. Due to the poor silica content, high aluminum-silicon ratio, and high calcium oxide content, this composition shows excessive glass density, low forming temperature, high liquidus temperature, and small forming range $\Delta T$ value. These factors are not conducive to the forming of glass fiber and the improvement of lightweight level.

SUMMARY

The objective of the present disclosure is to provide a low-density high-performance glass fiber composition, a glass fiber and a composite material. The glass fiber composition has the characteristics of low density and high modulus, and has higher specific modulus and specific strength, better lightweight level, and cost advantages. It can also improve the crystallization temperature and rate of the glass, and expand the forming range of the glass fiber. Therefore, the composition is conducive to reducing production difficulty and improving production efficiency, and is suitable for large-scale tank furnace production of lightweight high-performance glass fibers.

In accordance with one embodiment of the present disclosure, there is provided a low-density high-performance glass fiber composition, comprising the following components expressed as percentage by weight:

| | |
|---|---|
| $SiO_2$ | 58.1-61.9% |
| $Al_2O_3$ | >19.8% and ≤23% |
| MgO | 9.6-12.7% |
| CaO | 4.1-7.9% |
| $SrO + Li_2O$ | 0.05-2.2% |
| SrO | 0-2% |
| $Li_2O$ | 0-0.39% |
| $Na_2O$ | 0.05-1.0% |
| $R_2O = Na_2O + K_2O + Li_2O$ | 0.2-1.6% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | 78-84% | wherein a total content of the above components is greater than or equal to 98.5%; a weight percentage ratio $C1=SiO_2/(CaO+Li_2O)$ is greater than or equal to 7.05, a weight percentage ratio $C2=(R_2O+SrO)/Al_2O_3$ is greater than or equal to 0.012, and a weight percentage ratio $C3=(MgO+SrO)/CaO$ is greater than or equal to 1.22.

In a class of this embodiment, the weight percentage ratio $C4=SiO_2/(Al_2O_3+Li_2O)$ is greater than or equal to 2.64.

In a class of this embodiment, the weight percentage ratio $C5=(SiO_2+Al_2O_3)/(CaO+R_2O)$ is greater than or equal to 8.8.

In a class of this embodiment, the weight percentage ratio $C1=SiO_2/(CaO+Li_2O)$ is greater than or equal to 8.25.

In a class of this embodiment, the weight percentage ratio $C3=(MgO+SrO)/CaO$ is greater than 1.50.

In a class of this embodiment, the weight percentage of CaO is 4.1%-6.9%.

In a class of this embodiment, the weight percentage of SrO is 0.05%-2%.

In a class of this embodiment, the low-density high-performance glass fiber composition comprises the following components expressed as percentage by weight:

| | |
|---|---|
| $SiO_2$ | 58.4-61.5% |
| $Al_2O_3$ | >19.8% and ≤23% |
| MgO | 9.6-12.7% |
| CaO | 4.1-7.5% |
| $SrO + Li_2O$ | 0.05-2.2% |
| SrO | 0-2% |
| $Li_2O$ | 0-0.39% |
| $Na_2O$ | 0.05-1.0% |
| $R_2O = Na_2O + K_2O + Li_2O$ | 0.2-1.6% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | 78.3-84% |
| $CaO + MgO + R_2O$ | ≤20.3% | wherein the total content of the above components is greater than or equal to 98.5%; the weight percentage ratio $C1=SiO_2/(CaO+Li_2O)$ is greater than or equal to 7.45, the weight percentage ratio $C2=(R_2O+SrO)/Al_2O_3$ is greater than or equal to 0.012, the weight percentage ratio $C3=(MgO+SrO)/CaO$ is greater than or equal to 1.30, and the weight percentage ratio $C4=SiO_2/(Al_2O_3+Li_2O)$ is greater than or equal to 2.60.

In a class of this embodiment, the weight percentage of $Li_2O$ is 0.01%-0.35%.

In a class of this embodiment, the low-density high-performance glass fiber composition comprises the following components expressed as percentage by weight:

| | |
|---|---|
| $SiO_2$ | 58.1-61.9% |
| $Al_2O_3$ | >19.8% and ≤23% |
| MgO | 9.6-12.7% |
| CaO | 4.1-7.9% |
| $SrO + Li_2O$ | 0.05-2.2% |
| SrO | 0.01-2% |
| $Li_2O$ | 0.01-0.35% |
| $Na_2O$ | 0.05-1.0% |
| $R_2O = Na_2O + K_2O + Li_2O$ | 0.2-1.6% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | 78-84% | wherein the total content of the above components is greater than or equal to 98.5%; the weight percentage ratio $C1=SiO_2/(CaO+Li_2O)$ is greater than or equal to 7.05, the weight percentage ratio $C2=(R_2O+SrO)/Al_2O_3$ is greater than or equal to 0.012, and the weight percentage ratio $C3=(MgO+SrO)/CaO$ is greater than or equal to 1.22.

In a class of this embodiment, the weight percentage of $SiO_2$ is 58.4%-60.45%.

In a class of this embodiment, the weight percentage of $Al_2O_3$ is greater than 19.8% and less than or equal to 20.45%.

In a class of this embodiment, the low-density high-performance glass fiber composition comprises the following components expressed as percentage by weight:

| | |
|---|---|
| $SiO_2$ | 58.8-60.45% |
| $Al_2O_3$ | >19.8% and ≤23% |
| MgO | 9.6-12.5% |
| CaO | 4.1-6.9% |
| $SrO + Li_2O$ | 0.05-2.2% |
| SrO | 0-2% |
| $Li_2O$ | 0-0.39% |
| $Na_2O$ | 0.05-1.0% |
| $R_2O = Na_2O + K_2O + Li_2O$ | 0.2-1.35% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | >79% and ≤83.3% | wherein the total content of the above components is greater than or equal to 98.5%; the weight percentage ratio $C1=SiO_2/(CaO+Li_2O)$ is greater than or equal to 8.25, the weight percentage ratio $C2=(R_2O+SrO)/Al_2O_3$ is greater than or equal to 0.012, and the weight percentage ratio $C3=(MgO+SrO)/CaO$ is greater than or equal to 1.40.

In a class of this embodiment, the total content of $SiO_2$, $Al_2O_3$, MgO, and CaO is less than 99%.

In a class of this embodiment, the low-density high-performance glass fiber composition comprises the following components expressed as percentage by weight:

| | |
|---|---|
| $SiO_2$ | 58.8-60.45% |
| $Al_2O_3$ | >19.8% and ≤23% |
| MgO | 10-12.5% |
| CaO | 4.1-6.9% |
| $SrO + Li_2O$ | 0.05-2.2% |
| SrO | 0.05-2% |
| $Li_2O$ | 0-0.39% |
| $Na_2O$ | 0.05-1.0% |
| $R_2O = Na_2O + K_2O + Li_2O$ | 0.2-1.35% |
| $Fe_2O_3$ | 0.05-1% |

-continued

| | |
|---|---|
| $TiO_2$ | 0.01-2% |
| $B_2O_3$ | 0-2% |
| $ZrO_2$ | 0-2% |
| $SiO_2 + Al_2O_3$ | >79% and ≤83.3% |
| $CaO + MgO + R_2O$ | ≤19.6% | wherein the total content of the above components is greater than or equal to 98.5%; the weight percentage ratio $C1=SiO_2/(CaO+Li_2O)$ is greater than or equal to 8.25, the weight percentage ratio $C2=(R_2O+SrO)/Al_2O_3$ is greater than or equal to 0.012, the weight percentage ratio $C3=(MgO+SrO)/CaO$ is greater than or equal to 1.40, and the weight percentage ratio $C4=SiO_2/(Al_2O_3+Li_2O)$ is greater than or equal to 2.74.

In a class of this embodiment, the composition is free of $Li_2O$.

In a class of this embodiment, the composition is free of rare earth oxides.

In a class of this embodiment, the glass density of the composition is less than 2.60 g/cm³.

According to another aspect of the present disclosure, a glass fiber prepared by the glass fiber composition is provided.

According to yet another aspect of the present disclosure, a composite material incorporating the glass fiber is provided.

In the present disclosure, the main innovation of the glass fiber composition is as follows: appropriately increasing the contents of $SiO_2$ and $Al_2O_3$ and controlling the total amount of $SiO_2$ and $Al_2O_3$ and the ratio of $SiO_2$ to $Al_2O_3$, while appropriately reducing the total amount of alkaline earth metal oxides and controlling their ratio. Preferably, an appropriate amount of $SrO+Li_2O$ is introduced to precisely control ratios such as $SiO_2/(CaO+Li_2O)$, $(R_2O+SrO)/Al_2O_3$, $(MgO+SrO)/CaO$, $SiO_2/(Al_2O_3+Li_2O)$, and $(SiO_2+Al_2O_3)/(CaO+R_2O)$. Moreover, the total amounts of $Na_2O+K_2O+Li_2O$ and $CaO+MgO+R_{20}$ are further controlled. Through the aforementioned specific composition and ratio control, in the first aspect, the synergistic effect between silicon ions, aluminum ions, and oxygen ions can be improved; by controlling the ratios of oxygen to silicon and oxygen to aluminum, and controlling the total amount and proportion of ions outside the network such as alkali metals and alkaline earth metals, a better structure stacking effect can be obtained. This can not only increase the modulus of glass, but also reduce the density, thereby increasing the specific modulus and effectively improving the lightweight level of glass fibers. In the second aspect, the glass can be controlled to form a mixed crystal state such as cordierite, anorthite, and enstatite during devitrification, to avoid the absolute dominance of a single crystal phase. Competitive growth of various crystal phases in an appropriate ratio can effectively inhibit the recombination and arrangement of ions, thereby effectively reducing the risk of glass devitrification and the crystallization rate. In the third aspect, the glass forming temperature can be properly controlled, and the scope of glass fiber forming can be expanded, while ensuring cost advantage. This is suitable for large-scale production of lightweight high-performance glass fibers in tank furnaces.

Specifically, in the present disclosure, the low-density high-performance glass fiber composition comprises the following components expressed as percentage by weight:

| | |
|---|---|
| $SiO_2$ | 58.1-61.9% |
| $Al_2O_3$ | >19.8% and ≤23% |
| MgO | 9.6-12.7% |
| CaO | 4.1-7.9% |
| $SrO + Li_2O$ | 0.05-2.2% |
| SrO | 0-2% |
| $Li_2O$ | 0-0.39% |
| $Na_2O$ | 0.05-1.0% |
| $R_2O = Na_2O + K_2O + Li_2O$ | 0.2-1.6% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | 78-84% | wherein the total content of the above components is greater than or equal to 98.5%; the weight percentage ratio $C1=SiO_2/(CaO+Li_2O)$ is greater than or equal to 7.05, the weight percentage ratio $C2=(R_2O+SrO)/Al_2O_3$ is greater than or equal to 0.012, and the weight percentage ratio $C3=(MgO+SrO)/CaO$ is greater than or equal to 1.22.

The effect and content of each component in the glass fiber composition are described as follows:

$SiO_2$ is an oxide that forms a glass network as well as a main body that forms a glass framework, which can stabilize the other components and improve mechanical properties and chemical stability of the glass. In the glass fiber composition of the present disclosure, the weight percentage range of $SiO_2$ is limited to 58.1%-61.9%. In order to ensure excellent mechanical properties and to obtain lower density and higher specific modulus, the silica content is not less than 58.1%. In order to prevent the glass viscosity and liquidus temperature from being too high, making the glass difficult to melt and produce on large-scale, the silica content is not higher than 61.9%, which is obviously different from that of S-glass. Preferably, the weight percentage range of $SiO_2$ can be limited to 58.4%-61.5%. Preferably, the weight percentage range of $SiO_2$ can be limited to 58.4%-60.45%. Preferably, the weight percentage range of $SiO_2$ can be limited to 58.8%-60.45%. More preferably, the weight percentage range of $SiO_2$ can be limited to 59.15%-60.45%.

$Al_2O_3$ is an intermediate oxide that forms the glass network, which has a variety of coordination number transitions, and is also one of the oxides that form the glass framework. $Al_2O_3$ combined with $SiO_2$ can play a substantial role in the mechanical properties of the glass, and play an important role in affecting glass crystallization and acid corrosion resistance and other aspects. In order to obtain sufficiently high modulus, specific modulus and other properties of the glass, it is desirable to increase the content of $Al_2O_3$. However, if the $Al_2O_3$ content is too high, it will make the glass prone to crystallization or even phase separation, which will make the glass viscosity too high and make it difficult to melt and refine. In the glass fiber composition of the present disclosure, the weight percentage range of the $Al_2O_3$ is limited to greater than 19.8% and less than or equal to 23%. Preferably, the weight percentage range of $Al_2O_3$ can be limited to greater than 19.8% and less than or equal to 22.5%. Preferably, the weight percentage range of $Al_2O_3$ can be limited to 19.85%-22.2%. Preferably, the weight percentage range of $Al_2O_3$ can be limited to 19.9%-21.9%. More preferably, the weight percentage range of $Al_2O_3$ can be limited to 19.9%-21%.

In the glass fiber composition of the present disclosure, the total amount of $SiO_2+Al_2O_3$ is limited to 78%-84%. Preferably, the total amount of $SiO_2+Al_2O_3$ can be limited to 78.3%-84%. Preferably, the total amount of $SiO_2+Al_2O_3$ can be limited to 78.3%-83.3%. More preferably, the total amount of $SiO_2+Al_2O_3$ can be limited to greater than 79% and less than or equal to 83.3%. Precisely controlling the content, total amount, and proportion of $SiO_2$ and $Al_2O_3$ can not only obtain sufficiently high glass modulus, but also reduce the glass density and the risk of crystallization, and expand the forming range, which is conducive to achieving large-scale tank furnace production.

CaO is an external oxide of the glass network, and mainly plays a substantial role in improving the chemical stability of the glass, controlling the crystallization of the glass, and adjusting the viscosity and material properties of the glass. Through the researches, it is found that in a glass system with low alkali metal content and low amount of free oxygen, calcium ions can more effectively provide free oxygen to aluminum ions and change the coordination of aluminum and oxygen, while high-content magnesium ions tend to control oxygen ions around themselves while filling network gaps. In the glass fiber composition of the present disclosure, the weight percentage of CaO is limited to 4.1%-7.9%. Calcium ions can provide a large amount of free oxygen while filling the network gap, and form a mixed synergistic effect with magnesium ions/strontium ions in a certain ratio, which is conducive to obtaining a compact structure stacking effect, and is also conducive to the formation of cordierite $(Mg_2Al_4Si_5O_{18})$, anorthite $(CaAl_2Si_2O_8)$, enstatite $(Mg_2Si_2O_6)$ and other mixed crystal states during glass crystallization, so as to inhibit the crystallization and also help to improve the hardening rate of molten glass and increase the forming rate of the glass fiber. However, in order to obtain lower density and higher mechanical properties, the introduction of CaO should not exceed 7.9% given a high-content MgO. On the other hand, the introduction of CaO should not be less than 4.1%, because too low CaO content cannot provide a large amount of free oxygen, and cannot produce enough anorthite and cordierite to form effective competition during glass crystallization. Preferably, the weight percentage range of CaO can be limited to 4.1%-7.5%. Preferably, the weight percentage range of CaO can be limited to 4.1%-6.9%. Preferably, the weight percentage range of CaO can be limited to 4.7%-6.9%. More preferably, the weight percentage range of CaO can be limited to 5.3%-6.9%.

MgO is an intermediate oxide of the glass network, and mainly plays a substantial role in increasing the glass modulus, controlling the glass crystallization, and adjusting the glass viscosity and hardening rate. It is found through researches that in a glass system with low alkali metal content and high aluminium oxide content, MgO is generally located outside the glass network in the form of $[MgO_6]$ octahedron, and plays a role of balancing electrovalence around $[AlO_4]$. However, significant changes in the amount of free oxygen in the glass may affect the coordination number of magnesium ions. In the glass fiber composition of the present disclosure, the weight percentage range of MgO is limited to 9.6%-12.7%. Preferably, the weight percentage range of MgO can be limited to 9.6%-12.5%. Preferably, the weight percentage range of MgO can be limited to 10%-12.5%. More preferably, the weight percentage range of MgO can be limited to 10%-12%.

SrO is an external oxide of the glass network, and mainly plays a substantial role in controlling glass crystallization, improving the mechanical and optical properties of the glass, and adjusting the viscosity of the glass. In the glass fiber composition of the present disclosure, the weight percentage of SrO is limited to 0%-2%. A large number of experimental studies have shown that an appropriate amount of SrO can be introduced into the glass composition of the present disclosure. By reasonably controlling the content, total amount, and ratio of various alkaline earth metal oxides, the effect of the ternary mixture of CaO, MgO, and SrO alkaline earth effect is significantly improved compared with a binary mixed alkaline earth effect of the CaO and MgO. The glass structure is easier to stack closely, resulting in more excellent crystallization, mechanical, and optical performances of the glass. Since the ionic radius of $Mg^{2+}$, $Ca^{2+}$, and $Sr^{2+}$ increases sequentially and the ionic field strength decreases sequentially, the quantity grading of the three ions is very important in order to achieve tight stacking of structures. Preferably, the weight percentage range of SrO can be limited to 0.01%-2%. Preferably, the weight percentage range of SrO can be limited to 0.05%-2%. More preferably, the weight percentage range of SrO can be limited to 0.2%-1.5%.

NaO is an external oxide of the glass network. As a glass flux, $Na_2O$ can break the network, reduce the viscosity of the glass, improve the melting of the glass, and effectively provide free oxygen. However, the introduction of $Na_2O$ will also reduce the mechanical properties, chemical stability, and thermal stability of the glass. Therefore, the amount of $Na_2O$ introduced in the low density and high-performance glass fiber composition of the present disclosure should not be too much. In the glass fiber composition of the present disclosure, the weight percentage range of the $Na_2O$ is limited to 0.05%-1.0%. Preferably, the weight percentage range of $Na_2O$ can be limited to 0.05%-0.8%. Preferably, the weight percentage range of $Na_2O$ can be limited to 0.05%-0.65%. More preferably, the weight percentage range of $Na_2O$ can be limited to 0.05%-0.5%. $K_2O$ is an external oxide of the glass network, and can also play a role in breaking the network, but has a slightly lower effect in reducing the viscosity of the glass than that of the $Na_2O$. $K_2O$ can further effectively reduce the surface tension and increase the transparency of the glass. When being used in conjunction with the $Na_2O$, it can produce a mixed alkali effect in a certain proportion, which is beneficial to obtain better glass ion accumulation effect. However, too high $K_2O$ content may also affect the chemical stability and thermal stability of the glass, so the introduction amount should not be too much. In the glass fiber composition of the present disclosure, further, the weight percentage range of $K_2O$ is limited to 0.05%-0.8%. More preferably, the weight percentage range of $K_2O$ can be limited to 0.1%-0.6%.

$Li_2O$ is an external oxide of the glass network and plays a special role in the glass. When the oxygen-silicon ratio is low, $Li_2O$ mainly acts as a bond breaker, which can significantly reduce the viscosity of the glass and improve the melting performance of the glass. When the oxygen-silicon ratio is high, since the radius of lithium ions is smaller than that of sodium and potassium ions, there is a strong ion field, and $Li_2O$ mainly plays the role of accumulation. Meanwhile, a small amount of $Li_2O$ can also provide considerable free oxygen, which is beneficial for more aluminum ions to form tetrahedral coordination, thereby enhancing the glass network structure, improving glass performance, and improving glass crystallization. However, due to the high price of lithium raw materials, too much $Li_2O$ will lead to high costs, which significantly affects the price and cost performance of the product. Moreover, an excessive amount of $Li_2O$ is easy to significantly reduce the viscosity of glass, and narrow the scope range of glass fiber formation, which is not conducive to large-scale production and industrial application. In addition, the chemical stability of high-lithium glass may also be reduced. Therefore, in the glass fiber composition of the present disclosure, the weight percentage range of $Li_2O$ is limited to 0%-0.39%. According to different technical requirements, in one technical solution, preferably, the weight percentage range of $Li_2O$ can be limited to 0.01%-0.35%; preferably, the weight percentage range of $Li_2O$ can be limited to 0.01%-0.25%; and more preferably, the weight percentage range of $Li_2O$ can be limited to 0.01%-0.2%. In the other technical solution, preferably, the weight percentage range of $Li_2O$ can be limited to 0%-0.35%; and more preferably, the weight percentage range of $Li_2O$ can be limited to 0%-0.2%. Further, in order to reduce the production cost and expand the forming range, the glass fiber composition of the present application may not contain $Li_2O$.

In the glass fiber composition of the present disclosure, in order to balance the control of glass crystallization, glass density, cost, and the provision of free oxygen, and flexibly utilize the combination advantages of strontium oxide and lithium oxide. the weight percentage range of $SrO+Li_2O$ is limited to 0.05%-2.2%. Preferably, the weight percentage range of $SrO+Li_2O$ can be limited to 0.1%-2%. Preferably, the weight percentage range of $SrO+Li_2O$ can be limited to 0.2%-2%. More preferably, the weight percentage range of $SrO+Li_2O$ can be limited to 0.2%-1.5%.

In the glass fiber composition of the present disclosure, the weight percentage range of $Na_2O+K_2O+Li_2O$ is limited to 0.2%-1.6%. Preferably, the weight percentage range of $Na_2O+K_2O+Li_2O$ can be limited to 0.2%-1.35%. Preferably, the weight percentage range of $Na_2O+K_2O+Li_2O$ can be limited to 0.25%-1%. More preferably, the weight percentage range of $Na_2O+K_2O+Li_2O$ can be limited to 0.25%-0.8%.

In the present disclosure, in order to ensure glass performance, reduce density, and control the oxygen-silicon ratio, the range of the weight percentage ratio $C1=SiO_2/(CaO+Li_2O)$ is limited to greater than or equal to 7.05. Preferably, the range of the weight percentage ratio $C1=SiO_2/(CaO+Li_2O)$ can be limited to greater than or equal to 7.45. Preferably, the range of the weight percentage ratio $C1=SiO_2/(CaO+Li_2O)$ can be limited to greater than or equal to 8.25. Preferably, the range of the weight percentage ratio $C1=SiO_2/(CaO+Li_2O)$ can be limited to 8.25-12.30. More preferably, the range of the weight percentage ratio $C1=SiO_2/(CaO+Li_2O)$ can be limited to 8.30-11.60.

In order to control the crystallization, density, and oxygen-aluminum ratio of the glass, considering the demand of $Al^{3+}$ ions for free oxygen, the present disclosure intends to promote more aluminum ions to form aluminum oxide tetrahedrons, so as to strengthen the glass network structure, improve glass performance, and inhibit glass devitrification. Therefore, in the glass fiber composition of the present disclosure, the range of the weight percentage ratio $C2=(R_2O+SrO)/Al_2O_3$ is limited to greater than or equal to 0.012. Preferably, the range of the weight percentage ratio $C2=(R_2O+SrO)/Al_2O_3$ can be limited to greater than or equal to 0.015-0.10. Preferably, the range of the weight percentage ratio $C2=(R_2O+SrO)/Al_2O_3$ can be limited to 0.02-0.085. More preferably, the range of the weight percentage ratio $C2=(R_2O+SrO)/Al_2O_3$ can be limited to 0.02-0.065.

In order to improve glass performance and control glass devitrification, in the glass fiber composition of the present disclosure, the range of the weight percentage ratio $C3=(MgO+SrO)/CaO$ is limited to greater than or equal to 1.22. Preferably, the range of the weight percentage ratio $C3=(MgO+SrO)/CaO$ can be limited to greater than or equal to 1.30. Preferably, the range of the weight percentage ratio $C3=(MgO+SrO)/CaO$ can be limited to greater than or equal to 1.40. Preferably, the range of the weight percentage ratio $C3=(MgO+SrO)/CaO$ can be limited to greater than 1.50. More preferably, the range of the weight percentage ratio $C3=(MgO+SrO)/CaO$ can be limited to greater than 1.50 and less than or equal to 2.50.

Further, in the glass fiber composition of the disclosure, the range of the weight percentage ratio $C4=SiO_2/(Al_2O_3+Li_2O)$ is limited to greater than or equal to 2.60. Preferably, the range of the weight percentage ratio $C4=SiO_2/(Al_2O_3+Li_2O)$ can be limited to greater than or equal to 2.64. Preferably, the range of the weight percentage ratio $C4=SiO_2/(Al_2O_3+Li_2O)$ can be limited to greater than or equal to 2.74. More preferably, the range of the weight percentage ratio $C4=SiO_2/(Al_2O_3+Li_2O)$ can be limited to greater than or equal to 2.80.

Further, in the glass fiber composition of the disclosure, the range of the weight percentage ratio $C5=(SiO_2+Al_2O_3)/(CaO+R_2O)$ can be limited to greater than or equal to 8.8. Preferably, the range of the weight percentage ratio $C5=(SiO_2+Al_2O_3)/(CaO+R_2O)$ can be limited to greater than or equal to 9.4. Preferably, the range of the weight percentage ratio $C5=(SiO_2+Al_2O_3)/(CaO+R_2O)$ can be limited to 9.8-15.0. More preferably, the range of the weight percentage ratio $C5=(SiO_2+Al_2O_3)/(CaO+R_2O)$ can be limited to 10.3-14.5.

Further, in the glass fiber composition of the disclosure, the range of the weight percentage ratio $C6=(Na_2O+K_2O)/R_2O$ can be limited to greater than or equal to 0.40. Preferably, the range of the weight percentage ratio $C6=(Na_2O+K_2O)/R_2O$ can be limited to greater than or equal to 0.50. More preferably, the range of the weight percentage ratio $C6=(Na_2O+K_2O)/R_2O$ can be limited to greater than or equal to 0.55.

In the glass fiber composition of the disclosure, the weight percentage range of $CaO+MgO+R_2O$ is limited to less than or equal to 20.3%. Preferably, the weight percentage range of $CaO+MgO+R_2O$ can be limited to less than or equal to 19.6%. Preferably, the weight percentage range of $CaO+MgO+R_2O$ can be limited to less than or equal to 19.2%. More preferably, the weight percentage range of $CaO+MgO+R_2O$ can be limited to 16%-19.2%.

$Fe_2O_3$ is beneficial to the melting of glass and can also improve the crystallization performance of glass. However, due to the coloring effect of iron ions and ferrous ions, the introduction amount should not be much. Therefore, in the glass fiber composition of the disclosure, the weight percentage range of $Fe_2O_3$ is limited to 0.05%-1%. Preferably, the weight percentage range of $Fe_2O_3$ can be limited to 0.05%-0.75%. More preferably, the weight percentage range of $Fe_2O_3$ can be limited to 0.1%-0.65%.

$TiO_2$ can not only reduce the viscosity of high-temperature glass, but also has a certain fluxing effect. However, since the combination of titanium ions and iron ions has a certain coloring effect, which can affect the appearance of glass fiber products, the content of $TiO_2$ should not be too much. Therefore, in the present disclosure, the weight percentage range of $TiO_2$ is limited to 0.01%-2%. Preferably, the weight percentage range of $TiO_2$ can be limited to 0.05%-1.5%. More preferably, the weight percentage range of $TiO_2$ can be limited to 0.05%-0.7%.

In the present disclosure, an appropriate amount of $B_2O_3$ can be selectively introduced to further reduce the glass density and improve glass crystallization. In the glass fiber composition of the disclosure, the weight percentage range of $B_2O_3$ is limited to 0%-2%. Preferably, the weight percentage range of $B_2O_3$ can be limited to 0%-1.5%. In the present disclosure, changes are made according to different technical requirements. In one technical solution, in order to improve the mechanical properties and chemical stability of the glass, the glass fiber composition of the present disclosure can basically not contain $B_2O_3$. In another technical solution, on the basis of ensuring the performance, the glass density is further reduced. Therefore, further, the weight percentage range of $B_2O_3$ can be limited to 0.1%-1.5%.

In the present disclosure, an appropriate amount of $ZrO_2$ can be selectively introduced to improve the chemical stability and heat resistance of the glass. The weight percentage range of $ZrO_2$ is limited to 0%-2%. Preferably, the weight percentage range of $ZrO_2$ can be limited to 0%-1%. According to different technical requirements, in one technical solution, in order to control the glass density, the glass fiber composition of the present application can substantially be free of $ZrO_2$. However, it does not exclude trace amounts of zirconia brought in as impurities by zirconia-containing refractory materials.

Moreover, the above components are the main components of the present disclosure, and the total weight percentage thereof is limited to greater than or equal to 98.5%. Preferably, the total weight percentage of the main components can be limited to greater than or equal to 99%. Preferably, the total weight percentage of the main components can be limited to greater than or equal to 99.5%.

In the present disclosure, in addition to the above main components, the glass fiber composition may also contain a small amount of other components, with a total weight percentage of less than 1.5%. Further, the glass fiber composition may contain the other components with a weight percentage of less than 1%. Further, the glass fiber composition may contain the other components with a weight percentage of less than 0.5%. Further, the glass fiber composition may also contain F with a weight percentage content range of less than 0.5%, which is generally carried in as impurities from the glass raw materials.

Further, in order to control production costs and glass density, the glass fiber composition of the present application may not contain rare earth oxides.

Further, the glass density of the glass fiber composition in the present application can be controlled to be less than or equal to 2.61 $g/cm^3$. Preferably, the glass density of the composition is less than 2.60 $g/cm^3$. Preferably, the glass density of the composition is less than or equal to 2.59 $g/cm^3$. More preferably, the glass density of the composition is less than or equal to 2.58 $g/cm^3$.

Further, the glass fiber forming temperature of the glass fiber composition in the present application can be controlled to be less than or equal to 1360° C. Preferably, the glass fiber forming temperature range of the composition is 1290-1360° C. Preferably, the glass fiber forming temperature range of the composition is greater than 1300° C. and less than or equal to 1360° C. More preferably, the glass fiber forming temperature of the composition is 1306-1355° C.

In the glass fiber composition of the present disclosure, the beneficial effect of selecting the content of each component in the above range will be illustrated by the specific experimental data provided in embodiments.

The following are examples of preferred value ranges of each component included in the glass fiber composition according to the present disclosure.

Preferred Example 1

The glass fiber composition according to the present application comprises the following components expressed as percentage by weight:

| | |
|---|---|
| $SiO_2$ | 58.4-60.45% |
| $Al_2O_3$ | >19.8% and ≤23% |
| MgO | 9.6-12.7% |
| CaO | 4.1-7.5% |
| $SrO + Li_2O$ | 0.05-2.2% |
| SrO | 0-2% |
| $Li_2O$ | 0-0.39% |
| $Na_2O$ | 0.05-1.0% |
| $R_2O = Na_2O + K_2O + Li_2O$ | 0.2-1.6% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | 78.3-84% | wherein the total content of the above components is greater than or equal to 98.5%; the weight percentage ratio $C1=SiO_2/(CaO+Li_2O)$ is greater than or equal to 8.25, the weight percentage ratio $C2=(R_2O+SrO)/Al_2O_3$ is greater than or equal to 0.012, and the weight percentage ratio $C3=(MgO+SrO)/CaO$ is greater than or equal to 1.30.

Preferred Example 2

The glass fiber composition according to the present application comprises the following components expressed as percentage by weight:

| | |
|---|---|
| $SiO_2$ | 58.1-61.9% |
| $Al_2O_3$ | >19.8% and ≤23% |
| MgO | 9.6-12.7% |
| CaO | 4.1-7.9% |
| $SrO + Li_2O$ | 0.05-2.2% |
| SrO | 0.01-2% |
| $Li_2O$ | 0-0.39% |
| $Na_2O$ | 0.05-1.0% |
| $R_2O = Na_2O + K_2O + Li_2O$ | 0.2-1.6% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | 78-84% | wherein the total content of the above components is greater than or equal to 98.5%; the weight percentage ratio $C1=SiO_2/(CaO+Li_2O)$ is greater than or equal to 7.05, the weight percentage ratio $C2=(R_2O+SrO)/Al_2O_3$ is greater than or equal to 0.012, the weight percentage ratio $C3=(MgO+SrO)/CaO$ is greater than or equal to 1.22, and the weight percentage ratio $C4=SiO_2/(Al_2O_3+Li_2O)$ is greater than or equal to 2.64.

Preferred Example 3

The glass fiber composition according to the present application comprises the following components expressed as percentage by weight:

| | |
|---|---|
| $SiO_2$ | 58.4-60.45% |
| $Al_2O_3$ | >19.8% and ≤23% |
| MgO | 9.6-12.7% |
| CaO | 4.1-6.9% |
| $SrO + Li_2O$ | 0.05-2.2% |
| SrO | 0.01-2% |
| $Li_2O$ | 0.01-0.35% |
| $Na_2O$ | 0.05-1.0% |
| $R_2O = Na_2O + K_2O + Li_2O$ | 0.2-1.35% |

-continued

| | |
|---|---|
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | 78.3-83.3% | wherein the total content of the above components is greater than or equal to 98.5%; the weight percentage ratio $C1=SiO_2/(CaO+Li_2O)$ is greater than or equal to 8.25, the weight percentage ratio $C2=(R_2O+SrO)/Al_2O_3$ is greater than or equal to 0.012, and the weight percentage ratio $C3=(MgO+SrO)/CaO$ is greater than or equal to 1.40.

Preferred Example 4

The glass fiber composition according to the present application comprises the following components expressed as percentage by weight:

| | |
|---|---|
| $SiO_2$ | 58.1-61.9% |
| $Al_2O_3$ | >19.8% and ≤23% |
| $MgO$ | 9.6-12.7% |
| $CaO$ | 4.1-7.5% |
| $SrO + Li_2O$ | 0.05-2.2% |
| $SrO$ | 0-2% |
| $Li_2O$ | 0-0.39% |
| $Na_2O$ | 0.05-1.0% |
| $R_2O = Na_2O + K_2O + Li_2O$ | 0.2-1.6% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | 78-84% | wherein the total content of the above components is greater than or equal to 98.5%; the weight percentage ratio $C1=SiO_2/(CaO+Li_2O)$ is greater than or equal to 8.25, the weight percentage ratio $C2=(R_2O+SrO)/Al_2O_3$ is greater than or equal to 0.012, and the weight percentage ratio $C3=(MgO+SrO)/CaO$ is greater than 1.50.

Preferred Example 5

The glass fiber composition according to the present application comprises the following components expressed as percentage by weight:

| | |
|---|---|
| $SiO_2$ | 58.4-60.45% |
| $Al_2O_3$ | >19.8% and ≤23% |
| $MgO$ | 9.6-12.7% |
| $CaO$ | 4.1-6.9% |
| $SrO + Li_2O$ | 0.05-2.2% |
| $SrO$ | 0-2% |
| $Li_2O$ | 0-0.39% |
| $Na_2O$ | 0.05-1.0% |
| $R_2O = Na_2O + K_2O + Li_2O$ | 0.2-1.35% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | 78.3-83.3% | wherein the total content of the above components is greater than or equal to 98.5%; the weight percentage ratio $C1=SiO_2/(CaO+Li_2O)$ is greater than or equal to 8.25, the weight percentage ratio $C2=(R_2O+SrO)/$ $Al_2O_3$ is greater than or equal to 0.012, and the weight percentage ratio $C3=(MgO+SrO)/CaO$ is greater than 1.50.

Preferred Example 6

The glass fiber composition according to the present application comprises the following components expressed as percentage by weight:

| | |
|---|---|
| $SiO_2$ | 58.1-61.9% |
| $Al_2O_3$ | >19.8% and ≤23% |
| $MgO$ | 9.6-12.7% |
| $CaO$ | 4.1-7.9% |
| $SrO + Li_2O$ | 0.05-2.2% |
| $SrO$ | 0-2% |
| $Li_2O$ | 0-0.39% |
| $Na_2O$ | 0.05-1.0% |
| $R_2O = Na_2O + K_2O + Li_2O$ | 0.2-1.6% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | 78-84% | wherein the total content of the above components is greater than or equal to 98.5%; the weight percentage ratio $C1=SiO_2/(CaO+Li_2O)$ is greater than or equal to 7.05, the weight percentage ratio $C2=(R_2O+SrO)/Al_2O_3$ is greater than or equal to 0.012, the weight percentage ratio $C3=(MgO+SrO)/CaO$ is greater than or equal to 1.22, and the weight percentage ratio $C4=SiO_2/(Al_2O_3+Li_2O)$ is greater than or equal to 2.60. The composition is free of rare earth oxides.

Preferred Example 7

The glass fiber composition according to the present application comprises the following components expressed as percentage by weight:

| | |
|---|---|
| $SiO_2$ | 58.1-61.9% |
| $Al_2O_3$ | >19.8% and ≤23% |
| $MgO$ | 9.6-12.7% |
| $CaO$ | 4.1-6.9% |
| $SrO + Li_2O$ | 0.05-2% |
| $SrO$ | 0.05-2% |
| $Li_2O$ | 0% |
| $Na_2O$ | 0.05-1.0% |
| $R_2O = Na_2O + K_2O + Li_2O$ | 0.2-1.6% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | 78-84% | wherein the total content of the above components is greater than or equal to 98.5%; the weight percentage ratio $C1=SiO_2/(CaO+Li_2O)$ is greater than or equal to 8.25, the weight percentage ratio $C2=(R_2O+SrO)/Al_2O_3$ is greater than or equal to 0.012, the weight percentage ratio $C3=(MgO+SrO)/CaO$ is greater than or equal to 1.40, and the weight percentage ratio $C4=SiO_2/(Al_2O_3+Li_2O)$ is greater than or equal to 2.60, and the total content of $SiO_2$, $Al_2O_3$, $MgO$, and $CaO$ is less than 99%.

Preferred Example 8

The glass fiber composition according to the present application comprises the following components expressed as percentage by weight:

| | |
|---|---|
| $SiO_2$ | 58.4-60.45% |
| $Al_2O_3$ | >19.8% and ≤23% |
| MgO | 9.6-12.7% |
| CaO | 4.1-7.9% |
| $SrO + Li_2O$ | 0.05-2.2% |
| SrO | 0-2% |
| $Li_2O$ | 0-0.39% |
| $Na_2O$ | 0.05-1.0% |
| $R_2O = Na_2O + K_2O + Li_2O$ | 0.2-1.6% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | 78.3-83.3% | wherein the total content of the above components is greater than or equal to 98.5%; the weight percentage ratio $C1=SiO_2/(CaO+Li_2O)$ is greater than or equal to 7.05, the weight percentage ratio $C2=(R_2O+SrO)/Al_2O_3$ is greater than or equal to 0.012, the weight percentage ratio $C3=(MgO+SrO)/CaO$ is greater than or equal to 1.22, and the weight percentage ratio $C4=SiO_2/(Al_2O_3+Li_2O)$ is greater than or equal to 2.60, and the glass density of the composition is less than 2.60 g/cm³.

Preferred Example 9

The glass fiber composition according to the present application comprises the following components expressed as percentage by weight:

| | |
|---|---|
| $SiO_2$ | 58.4-60.45% |
| $Al_2O_3$ | >19.8% and ≤23% |
| MgO | 9.6-12.5% |
| CaO | 4.1-6.9% |
| $SrO + Li_2O$ | 0.05-2.2% |
| SrO | 0-2% |
| $Li_2O$ | 0-0.39% |
| $Na_2O$ | 0.05-1.0% |
| $R_2O = Na_2O + K_2O + Li_2O$ | 0.2-1.6% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | 78.3-83.3% | wherein the total content of the above components is greater than or equal to 98.5%; the weight percentage ratio $C1=SiO_2/(CaO+Li_2O)$ is greater than or equal to 8.25, the weight percentage ratio $C2=(R_2O+SrO)/Al_2O_3$ is greater than or equal to 0.012, the weight percentage ratio $C3=(MgO+SrO)/CaO$ is greater than 1.50, and the weight percentage ratio $C4=SiO_2/(Al_2O_3+Li_2O)$ is greater than or equal to 2.74.

Preferred Example 10

The glass fiber composition according to the present application comprises the following components expressed as percentage by weight:

| | |
|---|---|
| $SiO_2$ | 58.8-60.45% |
| $Al_2O_3$ | >19.8% and ≤23% |
| MgO | 10-12.5% |
| CaO | 4.1-6.9% |
| $SrO + Li_2O$ | 0.05-2.2% |
| SrO | 0-2% |
| $Li_2O$ | 0-0.39% |

| | |
|---|---|
| $Na_2O$ | 0.05-1.0% |
| $R_2O = Na_2O + K_2O + Li_2O$ | 0.2-1.35% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | >79% and ≤83.3% |
| $CaO + MgO + R_2O$ | ≤19.2% |

Wherein the total content of the above components is greater than or equal to 98.5%; the weight percentage ratio $C1=SiO_2/(CaO+Li_2O)$ is greater than or equal to 8.25, the weight percentage ratio $C2=(R_2O+SrO)/Al_2O_3$ is greater than or equal to 0.012, the weight percentage ratio $C3=(MgO+SrO)/CaO$ is greater than 1.50, and the weight percentage ratio $C4=SiO_2/(Al_2O_3+Li_2O)$ is greater than or equal to 2.74.

Preferred Example 11

The glass fiber composition according to the present application comprises the following components expressed as percentage by weight:

| | |
|---|---|
| $SiO_2$ | 58.8-60.45% |
| $Al_2O_3$ | >19.8% and ≤20.45% |
| MgO | 10-12.5% |
| CaO | 4.1-6.9% |
| $SrO + Li_2O$ | 0.05-2.2% |
| SrO | 0-2% |
| $Li_2O$ | 0-0.39% |
| $Na_2O$ | 0.05-1.0% |
| $R_2O = Na_2O + K_2O + Li_2O$ | 0.2-1.35% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | >79% and ≤80.9% | wherein the total content of the above components is greater than or equal to 98.5%; the weight percentage ratio $C1=SiO_2/(CaO+Li_2O)$ is greater than or equal to 8.25, the weight percentage ratio $C2=(R_2O+SrO)/Al_2O_3$ is greater than or equal to 0.012, and the weight percentage ratio $C3=(MgO+SrO)/CaO$ is greater than 1.50, and the total content of $SiO_2$, $Al_2O_3$, MgO, and CaO is less than 99%.

Preferred Example 12

The glass fiber composition according to the present application comprises the following components expressed as percentage by weight:

| | |
|---|---|
| $SiO_2$ | 59.15-60.45% |
| $Al_2O_3$ | >19.8% and ≤23% |
| MgO | 10-12.5% |
| CaO | 4.1-6.9% |
| $SrO + Li_2O$ | 0.05-2.2% |
| SrO | 0.01-2% |
| $Li_2O$ | 0-0.39% |
| $Na_2O$ | 0.05-1.0% |
| $R_2O = Na_2O + K_2O + Li_2O$ | 0.2-1.35% |
| $Fe_2O_3$ | 0.05-1% |
| $TiO_2$ | 0.01-2% |
| $B_2O_3$ | 0-2% |

-continued

| | |
|---|---|
| $ZrO_2$ | 0-2% |
| $SiO_2 + Al_2O_3$ | >79% and ≤83.3% |
| $CaO + MgO + R_2O$ | ≤19.2% | wherein the total content of the above components is greater than or equal to 99%; the weight percentage ratio $C1=SiO_2/(CaO+Li_2O)$ is greater than or equal to 8.25, the weight percentage ratio $C2=(R_2O+SrO)/Al_2O_3$ is greater than or equal to 0.012, the weight percentage ratio $C3=(MgO+SrO)/CaO$ is greater than 1.50, and the weight percentage ratio $C4=SiO_2/(Al_2O_3+Li_2O)$ is greater than or equal to 2.74, and the total content of $SiO_2$, $Al_2O_3$, MgO, and CaO is less than 99%, the density of the composition is less than 2.60 $g/cm^3$.

DETAILED DESCRIPTION

The following will provide a clear and complete description of the technical solution of the present application through the specific embodiments. Obviously, the described embodiments are merely some rather than all of the embodiments of the present disclosure. All other embodiments obtained by one skilled in the art based on the embodiments of the application without creative efforts should fall within the protection scope of the present application. What needs to be made clear is that, as long as there is no conflict, the embodiments in the present application and features in the embodiments can be arbitrarily combined with each other.

The basic idea of the present disclosure is that: the glass fiber composition comprises the following components expressed as percentage by weight: $SiO_2$: 58.1%-61.9%, $Al_2O_3$: >19.8% and ≤23%, MgO: 9.6%-12.7%, CaO: 4.1%-7.9%, $SrO+Li_2O$: 0.05%-2.2%, SrO: 0%-2%, $Li_2O$: 0%-0.39%, $Na_2O$: 0.05%-1.0%, $R_2O=Na_2O+K_2O+Li_2O$: 0.2%-1.6%, $Fe_2O_3$: 0.05%-1%, $TiO_2$: 0.01%-2%, $B_2O_3$: 0%-2%, $ZrO_2$: 0%-2%, and $SiO_2+Al_2O_3$: 78%-84%; and the total content of the above components is greater than or equal to 98.5%, the weight percentage ratio $C1=SiO_2/(CaO+Li_2O)$ is greater than or equal to 7.05, the weight percentage ratio $C2=(R_2O+SrO)/Al_2O_3$ is greater than or equal to 0.012, and the weight percentage ratio $C3=(MgO+SrO)/CaO$ is greater than or equal to 1.22. The glass fiber composition has the characteristics of low density and high modulus, and has higher specific modulus and specific strength, better lightweight level, and cost advantages. It can also improve the crystallization temperature and rate of the glass, and expand the forming range of the glass fiber. Therefore, the composition is conducive to reducing production difficulty and improving production efficiency, and is suitable for large-scale tank furnace production of lightweight high-performance glass fibers.

The specific content values of $SiO_2$, $Al_2O_3$, CaO, MgO, SrO, $Na_2O$, $K_2O$, $Li_2O$, $Fe_2O_3$, and $TiO_2$ in the glass fiber composition of the present disclosure are selected as examples, and then compared with the property parameters of three comparative examples. In the comparison, seven property parameters are selected as follows:

(1) Forming temperature, the temperature at which the glass melt has a viscosity of $10^3$ poise.

(2) Liquidus temperature, the temperature at which the crystal nucleuses begin to form when the glass melt cools off, that is, the upper limit temperature of glass crystallization.

(3) ΔT value, the difference between the forming temperature and the liquidus temperature, indicates the temperature range at which fiber drawing can be performed. The larger the forming range is, the more favorable it is for drawing.

(4) Glass modulus, represents the ability of the glass to resist elastic deformation, and an elastic modulus of a glass block is tested according to the ASTM E1876 standard.

(5) Glass density, represents specific gravity and lightweight level of the glass, and the glass density is tested according to the ASTM C693 standard.

(6) Specific modulus, which is calculated according to a ratio of the modulus and density of the glass, where 1 kg-9.8 N. The larger the specific modulus is, the greater the rigidity of the material and the better the lightweight level are.

(7) Crystal phase composition, represents the composition of the main crystal phases in glass crystalline materials, and the crystalline material can be tested and evaluated by X-ray diffraction (XRD). The cordierite is abbreviated as COR, the anorthite is abbreviated as ANO, the enstatite is abbreviated as ENS, the diopside is abbreviated as DIO, and the wollastonite is abbreviated as WOL.

The aforementioned seven parameters and the methods of measuring them are well-known to those skilled in the art. Therefore, these aforementioned parameters can effectively illustrate the property of the glass fiber composition of the present disclosure.

The specific procedures of the experiment are as follows: each component can be obtained from appropriate raw materials, and various raw materials are mixed in proportion to make each component reach the final expected weight percentage. The mixed batch is melted and refined, and a resulting molten glass is drawn through nozzles of the bushings, thereby forming the glass fiber. The glass fiber is attenuated onto the rotary collet of a winder to form cakes or packages. Of course, traditional methods can be used to further process these glass fibers to meet the expected requirements.

Comparisons of the property parameters of the examples of the glass fiber composition according to the present application with those of the comparative examples are further made below by way of tables, wherein the component contents of the compositions for producing glass fiber are expressed as weight percentage. What needs to be made clear is that the total amount of the components in an example is slightly less than 100%, and it should be understood that the remaining amount is trace impurities or a small amount of components which cannot be analyzed.

TABLE 1A

| | | A1 | A2 | A3 | A4 | A5 | A6 | A7 |
|---|---|---|---|---|---|---|---|---|
| Component | $SiO_2$ | 60.15 | 60.00 | 60.00 | 60.00 | 60.00 | 59.50 | 58.80 |
| | $Al_2O_3$ | 19.85 | 20.00 | 20.00 | 20.00 | 20.30 | 20.00 | 20.00 |
| | CaO | 6.25 | 6.40 | 6.40 | 6.40 | 5.90 | 6.90 | 7.90 |
| | MgO | 11.70 | 11.50 | 11.50 | 11.85 | 11.50 | 11.50 | 11.30 |
| | SrO | 0.35 | 0.35 | 0.35 | 0.00 | 0.50 | 0.35 | 0.35 |
| | $Na_2O$ | 0.35 | 0.35 | 0.55 | 0.35 | 0.25 | 0.35 | 0.35 |

TABLE 1A-continued

| | \ | A1 | A2 | A3 | A4 | A5 | A6 | A7 |
|---|---|---|---|---|---|---|---|---|
| | $K_2O$ | 0.25 | 0.25 | 0.25 | 0.25 | 0.25 | 0.25 | 0.25 |
| | $Li_2O$ | 0.15 | 0.20 | 0.00 | 0.20 | 0.25 | 0.20 | 0.10 |
| | $Fe_2O_3$ | 0.45 | 0.45 | 0.45 | 0.45 | 0.45 | 0.45 | 0.45 |
| | $TiO_2$ | 0.40 | 0.40 | 0.40 | 0.40 | 0.50 | 0.40 | 0.40 |
| Ratio | C1 | 9.40 | 9.09 | 9.38 | 9.09 | 9.76 | 8.38 | 7.35 |
| | C2 | 0.055 | 0.058 | 0.058 | 0.040 | 0.062 | 0.058 | 0.053 |
| | C3 | 1.93 | 1.85 | 1.85 | 1.85 | 2.03 | 1.72 | 1.47 |
| | C4 | 3.008 | 2.970 | 3.000 | 2.970 | 2.920 | 2.946 | 2.925 |
| | C5 | 11.429 | 11.111 | 11.111 | 11.111 | 12.075 | 10.325 | 9.163 |
| | C6 | 0.800 | 0.750 | 1.000 | 0.750 | 0.667 | 0.750 | 0.857 |
| Parameter | Forming temperature/° C. | 1327 | 1325 | 1332 | 1321 | 1328 | 1319 | 1310 |
| | Liquidus temperature/° C. | 1229 | 1231 | 1240 | 1237 | 1237 | 1227 | 1223 |
| | ΔT value/° C. | 98 | 94 | 92 | 84 | 91 | 92 | 87 |
| | Glass modulus/GPa | 95.4 | 95.7 | 95.2 | 95.7 | 96.1 | 95.5 | 95.2 |
| | Glass density/(g/cm³) | 2.579 | 2.579 | 2.579 | 2.578 | 2.576 | 2.585 | 2.596 |
| | Specific modulus/($10^5$ m) | 37.75 | 37.86 | 37.67 | 37.88 | 38.07 | 37.70 | 37.42 |
| | Main crystal phase composition | COR ANO ENS | COR ANO ENS | COR ANO ENS | COR ANO ENS | COR ANO ENS | COR ANO ENS | COR ANO ENS |

25

TABLE 1B

| | \ | A8 | A9 | A10 | A11 | A12 | A13 | A14 |
|---|---|---|---|---|---|---|---|---|
| Component | $SiO_2$ | 60.45 | 59.90 | 60.00 | 60.00 | 59.50 | 59.50 | 58.70 |
| | $Al_2O_3$ | 19.90 | 20.30 | 20.10 | 20.50 | 21.00 | 21.30 | 22.20 |
| | CaO | 6.10 | 6.90 | 5.90 | 6.50 | 6.90 | 6.70 | 6.70 |
| | MgO | 11.60 | 10.80 | 12.00 | 10.70 | 10.20 | 10.20 | 10.20 |
| | SrO | 0.20 | 0.40 | 0.40 | 0.45 | 0.50 | 0.40 | 0.40 |
| | $Na_2O$ | 0.40 | 0.30 | 0.30 | 0.40 | 0.40 | 0.35 | 0.25 |
| | $K_2O$ | 0.25 | 0.20 | 0.20 | 0.25 | 0.20 | 0.20 | 0.20 |
| | $Li_2O$ | 0.15 | 0.20 | 0.20 | 0.20 | 0.25 | 0.25 | 0.35 |
| | $Fe_2O_3$ | 0.40 | 0.40 | 0.35 | 0.45 | 0.45 | 0.45 | 0.45 |
| | $TiO_2$ | 0.45 | 0.50 | 0.45 | 0.45 | 0.50 | 0.55 | 0.45 |
| Ratio | C1 | 9.67 | 8.44 | 9.84 | 8.96 | 8.32 | 8.56 | 8.33 |
| | C2 | 0.050 | 0.054 | 0.055 | 0.063 | 0.064 | 0.056 | 0.054 |
| | C3 | 1.93 | 1.62 | 2.10 | 1.72 | 1.55 | 1.58 | 1.58 |
| | C4 | 3.015 | 2.922 | 2.956 | 2.899 | 2.800 | 2.761 | 2.603 |
| | C5 | 11.645 | 10.553 | 12.136 | 10.952 | 10.387 | 10.773 | 10.787 |
| | C6 | 0.813 | 0.714 | 0.714 | 0.765 | 0.706 | 0.688 | 0.563 |
| Parameter | Forming temperature/° C. | 1332 | 1326 | 1321 | 1331 | 1326 | 1330 | 1324 |
| | Liquidus temperature/° C. | 1233 | 1231 | 1246 | 1238 | 1246 | 1252 | 1258 |
| | ΔT value/° C. | 99 | 95 | 75 | 93 | 80 | 78 | 66 |
| | Glass modulus/GPa | 95.5 | 95.4 | 96.3 | 95.8 | 95.5 | 95.8 | 96.2 |
| | Glass density/(g/cm³) | 2.574 | 2.578 | 2.581 | 2.574 | 2.572 | 2.569 | 2.564 |
| | Specific modulus/($10^5$ m) | 37.86 | 37.76 | 38.07 | 37.98 | 37.89 | 38.05 | 38.29 |
| | Main crystal phase Component | COR ANO ENS | COR ANO ENS | COR ENS ANO | COR ANO ENS | COR ANO | COR ANO | COR ANO |

TABLE 1C

| | \ | A15 | A16 | A17 | A18 | A19 | A20 | A21 |
|---|---|---|---|---|---|---|---|---|
| Component | $SiO_2$ | 61.00 | 59.50 | 60.45 | 59.70 | 58.40 | 58.10 | 61.50 |
| | $Al_2O_3$ | 19.90 | 19.85 | 20.15 | 20.00 | 20.10 | 20.40 | 20.00 |
| | CaO | 5.30 | 6.90 | 6.10 | 6.20 | 7.50 | 6.90 | 6.15 |
| | MgO | 11.60 | 11.70 | 11.60 | 11.10 | 11.50 | 11.90 | 11.00 |
| | SrO | 0.55 | 0.40 | 0.00 | 1.20 | 0.40 | 1.20 | 0.00 |

TABLE 1C-continued

| | \ | A15 | A16 | A17 | A18 | A19 | A20 | A21 |
|---|---|---|---|---|---|---|---|---|
| | Na$_2$O | 0.20 | 0.35 | 0.21 | 0.55 | 0.50 | 0.25 | 0.30 |
| | K$_2$O | 0.40 | 0.40 | 0.25 | 0.25 | 0.20 | 0.25 | 0.20 |
| | Li$_2$O | 0.25 | 0.05 | 0.39 | 0.00 | 0.05 | 0.10 | 0.15 |
| | Fe$_2$O$_3$ | 0.35 | 0.40 | 0.40 | 0.40 | 0.55 | 0.40 | 0.30 |
| | TiO$_2$ | 0.35 | 0.35 | 0.35 | 0.50 | 0.70 | 0.40 | 0.30 |
| Ratio | C1 | 10.99 | 8.56 | 9.31 | 9.63 | 7.74 | 8.30 | 9.76 |
| | C2 | 0.070 | 0.060 | 0.042 | 0.100 | 0.057 | 0.088 | 0.033 |
| | C3 | 2.29 | 1.75 | 1.90 | 1.98 | 1.59 | 1.90 | 1.79 |
| | C4 | 3.027 | 2.990 | 2.943 | 2.985 | 2.898 | 2.834 | 3.052 |
| | C5 | 13.154 | 10.305 | 11.597 | 11.386 | 9.515 | 10.467 | 11.985 |
| | C6 | 0.706 | 0.938 | 0.541 | 1.000 | 0.933 | 0.833 | 0.769 |
| Parameter | Forming temperature/° C. | 1335 | 1326 | 1325 | 1334 | 1316 | 1312 | 1341 |
| | Liquidus temperature/° C. | 1244 | 1234 | 1233 | 1235 | 1230 | 1244 | 1235 |
| | ΔT value/° C. | 91 | 92 | 92 | 99 | 86 | 68 | 106 |
| | Glass modulus/GPa | 95.4 | 95.3 | 95.7 | 95.3 | 95.8 | 96.5 | 94.8 |
| | Glass density/(g/cm$^3$) | 2.574 | 2.586 | 2.572 | 2.587 | 2.594 | 2.599 | 2.565 |
| | Specific modulus/(10$^5$ m) | 37.82 | 37.60 | 37.97 | 37.59 | 37.69 | 37.89 | 37.71 |
| | Main crystal phase Component | COR ENS ANO | COR ANO ENS | COR ANO ENS | COR ANO ENS | COR ANO ENS | COR ANO ENS | COR ANO ENS |

TABLE 1D

| | \ | A22 | A23 | A24 | A25 | Comparative Example 1 | Comparative Example 2 | Comparative Example 3 |
|---|---|---|---|---|---|---|---|---|
| Component | SiO$_2$ | 60.00 | 60.45 | 59.85 | 60.45 | 59.70 | 60.18 | 57.33 |
| | Al$_2$O$_3$ | 20.00 | 20.05 | 20.25 | 20.50 | 14.00 | 17.15 | 19.61 |
| | CaO | 6.00 | 5.85 | 6.90 | 6.20 | 22.10 | 12.24 | 8.83 |
| | MgO | 11.25 | 11.40 | 10.80 | 11.25 | 2.70 | 9.43 | 10.93 |
| | SrO | 0.20 | 0.45 | 0.55 | 0.10 | — | — | — |
| | Na$_2$O | 0.35 | 0.15 | 0.65 | 0.20 | 0.45 | 0.50 | 0.12 |
| | K$_2$O | 0.20 | 0.35 | 0.15 | 0.15 | 0.25 | 0.00 | 0.13 |
| | Li$_2$O | 0.15 | 0.15 | 0.00 | 0.30 | 0.00 | 0.00 | 2.00 |
| | Fe$_2$O$_3$ | 0.35 | 0.35 | 0.35 | 0.35 | 0.40 | 0.00 | 0.34 |
| | TiO$_2$ | 0.40 | 0.40 | 0.40 | 0.40 | 0.30 | 0.50 | 0.68 |
| | B$_2$O$_3$ | 1.0 | — | — | — | — | — | — |
| | F | — | 0.30 | — | — | — | — | — |
| Ratio | C1 | 9.76 | 10.08 | 8.67 | 9.30 | 2.70 | 4.92 | 5.29 |
| | C2 | 0.045 | 0.055 | 0.067 | 0.037 | 0.050 | 0.029 | 0.115 |
| | C3 | 1.91 | 2.03 | 1.64 | 1.83 | 0.12 | 0.77 | 1.24 |
| | C4 | 2.978 | 2.993 | 2.956 | 2.906 | 4.264 | 3.509 | 2.653 |
| | C5 | 11.940 | 12.385 | 10.403 | 11.818 | 3.232 | 6.070 | 6.944 |
| | C6 | 0.786 | 0.769 | 1.000 | 0.538 | 1.000 | 1.000 | 0.111 |
| Parameter | Forming temperature/° C. | 1322 | 1328 | 1335 | 1333 | 1270 | 1304 | 1224 |
| | Liquidus temperature/° C. | 1225 | 1233 | 1236 | 1240 | 1185 | 1223 | 1199 |
| | ΔT value/° C. | 97 | 95 | 99 | 93 | 85 | 81 | 25 |
| | Glass modulus/GPa | 94.3 | 95.0 | 95.4 | 96.0 | 83.2 | 87.4 | 92.4 |
| | Glass density/(g/cm$^3$) | 2.569 | 2.579 | 2.580 | 2.569 | 2.627 | 2.615 | 2.620 |
| | Specific modulus/(10$^5$ m) | 37.46 | 37.59 | 37.73 | 38.13 | 32.32 | 34.10 | 35.99 |
| | Main crystal phase Component | COR ANO ENS | COR ANO ENS | COR ANO ENS | COR ANO ENS | ANO WOL | ANO DIO | ANO COR ENS |

It can be seen from the specific values in the above tables that, compared with typical boron-free E-glass (Comparative Example 1) and improved R-glass (Comparative Examples 2 and 3), the glass fiber composition of the present disclosure has the following advantages: (1) higher glass modulus; (2) lower glass density; (3) much higher specific modulus and lightweight level; (4) rich crystal phase composition in crystalline substances, which is beneficial to effectively inhibit glass crystallization and rate.

Compared with Comparative Example 3, the glass fiber composition of the present disclosure has lower lithium oxide content, which is beneficial to cost reduction and industrial application.

It can be seen that the glass fiber composition of the present disclosure has made breakthrough progress in terms of density, modulus, specific modulus, crystallization control, and low cost. The composition has better cost performance and lightweight level, and is easy to realize large-scale tank furnace production, thereby achieving extraordinary technical effects.

The glass fiber composition according to the present disclosure can be made into glass fibers having the above-mentioned excellent properties.

The glass fiber composition according to the present disclosure in combination with one or more organic and/or inorganic materials can be used for preparing composite materials having excellent performance. For example, glass fiber-reinforced substrates, and their typical applications include wind blades, automotive products, high-pressure vessels, and pipelines.

It should be noted that, in this text, the terms "comprise/comprising", "contain/containing" and any other variants thereof are non-exclusive, so that any process, method, object or device containing a series of elements contains not only such factors, but also other factors not listed clearly, or further contains inherent factors of the process, method, object or device. Without further restrictions, a factor defined by the statement "comprises/comprising an/a . . . ", "contain/containing an/a . . . " or any other variants thereof does not exclude other identical factors in the process, method, object or device including said factors.

The content described above can be implemented individually or in various combinations, and these modifications are all within the protection scope of the embodiments of the present disclosure.

At last, it should be noted that the foregoing embodiments are provided only for describing instead of limiting the technical solutions of the present disclosure. While particular embodiments of the disclosure have been shown and described, it will be obvious to one skilled in the art that modifications can be made to the technical solutions embodied by all the aforementioned embodiments, or that equivalent replacements can be made to some of the technical features embodied by all the aforementioned embodiments, without departing from the spirit and scope of the technical solutions of the present disclosure.

INDUSTRIAL APPLICABILITY

The glass fiber composition of the present application has the characteristics of low density and high modulus, and has higher specific modulus and specific strength, better lightweight level, and cost advantages. It can also improve the crystallization temperature and rate of the glass, and expand the forming range of the glass fiber. Therefore, the composition is conducive to reducing production difficulty and improving production efficiency, and is suitable for large-scale tank furnace production of lightweight high-performance glass fibers. The glass fiber composition can be combined with one or more organic and/or inorganic materials to prepare composites with excellent properties. For example, glass fiber-reinforced substrates can be obtained, and their typical applications include wind blades, automotive products, high-pressure vessels, and pipelines.

The invention claimed is:

1. A low-density high-performance glass fiber composition, comprising the following components expressed as percentage by weight:

| | |
|---|---|
| $SiO_2$ | 58.1-61.9% |
| $Al_2O_3$ | >19.8% and ≤23% |
| MgO | 9.6-12.7% |
| CaO | 4.1-7.9% |
| $SrO + Li_2O$ | 0.05-2.2% |
| SrO | 0-2% |
| $Li_2O$ | 0-0.39% |
| $Na_2O$ | 0.05-1.0% |
| $R_2O = Na_2O + K_2O + Li_2O$ | 0.2-1.6% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | 78-84% | wherein a total content of the above components is greater than or equal to 98.5%; a weight percentage ratio $C1=SiO_2/(CaO+Li_2O)$ is greater than or equal to 7.05, a weight percentage ratio $C2=(R_2O+SrO)/Al_2O_3$ is greater than or equal to 0.012, and a weight percentage ratio $C3=(MgO+SrO)/CaO$ is greater than or equal to 1.22;

wherein the composition is free of rare earth oxides.

2. The low-density high-performance glass fiber composition according to claim 1, wherein a weight percentage ratio $C4=SiO_2/(Al_2O_3+Li_2O)$ is greater than or equal to 2.64.

3. The low-density high-performance glass fiber composition according to claim 1, wherein a weight percentage ratio $C5=(SiO_2+Al_2O_3)/(CaO+R_2O)$ is greater than or equal to 8.8.

4. The low-density high-performance glass fiber composition according to claim 1, wherein the weight percentage ratio $C1=SiO_2/(CaO+Li_2O)$ is greater than or equal to 8.25.

5. The low-density high-performance glass fiber composition according to claim 1, wherein the weight percentage ratio $C3=(MgO+SrO)/CaO$ is greater than 1.50.

6. The low-density high-performance glass fiber composition according to claim 1, wherein the weight percentage of CaO is 4.1%-6.9%.

7. The low-density high-performance glass fiber composition according to claim 1, wherein the weight percentage of SrO is 0.05%-2%.

8. The low-density high-performance glass fiber composition according to claim 1, comprising the following components expressed as percentage by weight:

| | |
|---|---|
| $SiO_2$ | 58.4-61.5% |
| $Al_2O_3$ | >19.8% and ≤23% |
| MgO | 9.6-12.7% |
| CaO | 4.1-7.5% |
| $SrO + Li_2O$ | 0.05-2.2% |
| SrO | 0-2% |
| $Li_2O$ | 0-0.39% |
| $Na_2O$ | 0.05-1.0% |
| $R_2O = Na_2O + K_2O + Li_2O$ | 0.2-1.6% |

-continued

| | |
|---|---|
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | 78.3-84% |
| $CaO + MgO + R_2O$ | ≤20.3% | wherein the total content of the above components is greater than or equal to 98.5%; the weight percentage ratio $C1=SiO_2/(CaO+Li_2O)$ is greater than or equal to 7.45, the weight percentage ratio $C2=(R_2O+SrO)/Al_2O_3$ is greater than or equal to 0.012, the weight percentage ratio $C3=(MgO+SrO)/CaO$ is greater than or equal to 1.30, and the weight percentage ratio $C4=SiO_2/(Al_2O_3+Li_2O)$ is greater than or equal to 2.60.

9. The low-density high-performance glass fiber composition according to claim 1, wherein the weight percentage of $Li_2O$ is 0.01%-0.35%.

10. The low-density high-performance glass fiber composition according to claim 1, comprising the following components expressed as percentage by weight:

| | |
|---|---|
| $SiO_2$ | 58.1-61.9% |
| $Al_2O_3$ | >19.8% and ≤23% |
| $MgO$ | 9.6-12.7% |
| $CaO$ | 4.1-7.9% |
| $SrO + Li_2O$ | 0.05-2.2% |
| $SrO$ | 0.01-2% |
| $Li_2O$ | 0.01-0.35% |
| $Na_2O$ | 0.05-1.0% |
| $R_2O = Na_2O + K_2O + Li_2O$ | 0.2-1.6% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | 78-84% | wherein the total content of the above components greater than or equal to 98.5%; the weight percentage ratio $C1=SiO_2/(CaO+Li_2O)$ is greater than or equal to 7.05, the weight percentage ratio $C2=(R_2O+SrO)/Al_2O_3$ is greater than or equal to 0.012, and the weight percentage ratio $C3=(MgO+SrO)/CaO$ is greater than or equal to 1.22.

11. The low-density high-performance glass fiber composition according to claim 1, wherein the weight percentage of $SiO_2$ is 58.4%-60.45%.

12. The low-density high-performance glass fiber composition according to claim 1, wherein the weight percentage of $Al_2O_3$ is greater than 19.8% and less than or equal to 20.45%.

13. The low-density high-performance glass fiber composition according to claim 1, comprising the following components expressed as percentage by weight:

| | |
|---|---|
| $SiO_2$ | 58.8-60.45% |
| $Al_2O_3$ | >19.8% and ≤23% |
| $MgO$ | 9.6-12.5% |

-continued

| | |
|---|---|
| $CaO$ | 4.1-6.9% |
| $SrO + Li_2O$ | 0.05-2.2% |
| $SrO$ | 0-2% |
| $Li_2O$ | 0-0.39% |
| $Na_2O$ | 0.05-1.0% |
| $R_2O = Na_2O + K_2O + Li_2O$ | 0.2-1.35% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | >79% and ≤83.3% | wherein the total content of the above components is greater than or equal to 98.5%; the weight percentage ratio $C1=SiO_2/(CaO+Li_2O)$ is greater than or equal to 8.25, the weight percentage ratio $C2=(R_2O+SrO)/Al_2O_3$ is greater than or equal to 0.012, and the weight percentage ratio $C3=(MgO+SrO)/CaO$ is greater than or equal to 1.40.

14. The low-density high-performance glass fiber composition according to claim 1, wherein the total content of $SiO_2$, $Al_2O_3$, $MgO$, and $CaO$ is less than 99%.

15. The low-density high-performance glass fiber composition according to claim 1, comprising the following components expressed as percentage by weight:

| | |
|---|---|
| $SiO_2$ | 58.8-60.45% |
| $Al_2O_3$ | >19.8% and ≤23% |
| $MgO$ | 10-12.5% |
| $CaO$ | 4.1-6.9% |
| $SrO + Li_2O$ | 0.05-2.2% |
| $SrO$ | 0.05-2% |
| $Li_2O$ | 0-0.39% |
| $Na_2O$ | 0.05-1.0% |
| $R_2O = Na_2O + K_2O + Li_2O$ | 0.2-1.35% |
| $Fe_2O_3$ | 0.05-1% |
| $TiO_2$ | 0.01-2% |
| $B_2O_3$ | 0-2% |
| $ZrO_2$ | 0-2% |
| $SiO_2 + Al_2O_3$ | >79% and ≤83.3% |
| $CaO + MgO + R_2O$ | ≤19.6% | wherein the total content of the above components is greater than or equal to 98.5%; the weight percentage ratio $C1=SiO_2/(CaO+Li_2O)$ is greater than or equal to 8.25, the weight percentage ratio $C2=(R_2O+SrO)/Al_2O_3$ is greater than or equal to 0.012, the weight percentage ratio $C3=(MgO+SrO)/CaO$ is greater than or equal to 1.40, and the weight percentage ratio $C4=SiO_2/(Al_2O_3+Li_2O)$ is greater than or equal to 2.74.

16. The low-density high-performance glass fiber composition according to claim 1, wherein the composition is free of $Li_2O$.

17. The low-density high-performance glass fiber composition according to claim 1, wherein the glass density of the composition is less than 2.60 g/cm³.

18. A glass fiber, prepared by the glass fiber composition according to claim 1.

19. A composite material, incorporating the glass fiber according to claim 18.

* * * * *